United States Patent [19]

Besack

[11] 4,138,061

[45] Feb. 6, 1979

[54] SOLAR HEATING SYSTEM

[76] Inventor: Harold C. Besack, Box 458, 221 N. 21st St., Beatrice, Nebr. 68310

[21] Appl. No.: 824,881

[22] Filed: Aug. 15, 1977

[51] Int. Cl.² ................................................ F24J 3/02
[52] U.S. Cl. .................................... 237/1 A; 126/270; 126/400
[58] Field of Search ................ 237/1 A; 126/270, 400

[56]  References Cited
U.S. PATENT DOCUMENTS

| 3,981,295 | 9/1976 | Minnick | 237/1 A X |
|---|---|---|---|
| 4,006,856 | 2/1977 | Nilsson | 237/1 A |
| 4,010,731 | 3/1977 | Harrison | 126/400 X |
| 4,013,885 | 3/1977 | Blitz | 126/270 X |
| 4,015,585 | 4/1977 | Fattor | 237/1 A X |
| 4,016,861 | 4/1977 | Taylor | 126/400 X |
| 4,029,258 | 6/1977 | Groth | 126/270 X |
| 4,037,583 | 7/1977 | Bakun et al. | 126/400 X |
| 4,049,195 | 9/1977 | Rugenstein | 237/1 A |

*Primary Examiner*—William E. Wayner
*Assistant Examiner*—William E. Tapolcai, Jr.
*Attorney, Agent, or Firm*—Henderson, Sturm, Cepican & Fix

[57] ABSTRACT

A heating system is provided to convert radiant solar energy into heat for use in buildings. The apparatus includes a solar energy collection and heat radiation means, a heat storage means utilizing a heat retention medium, ducting means for providing pneumatic communication within the system, and fluid communication means for providing liquid communication within the system. A method of heating buildings is also disclosed.

6 Claims, 7 Drawing Figures

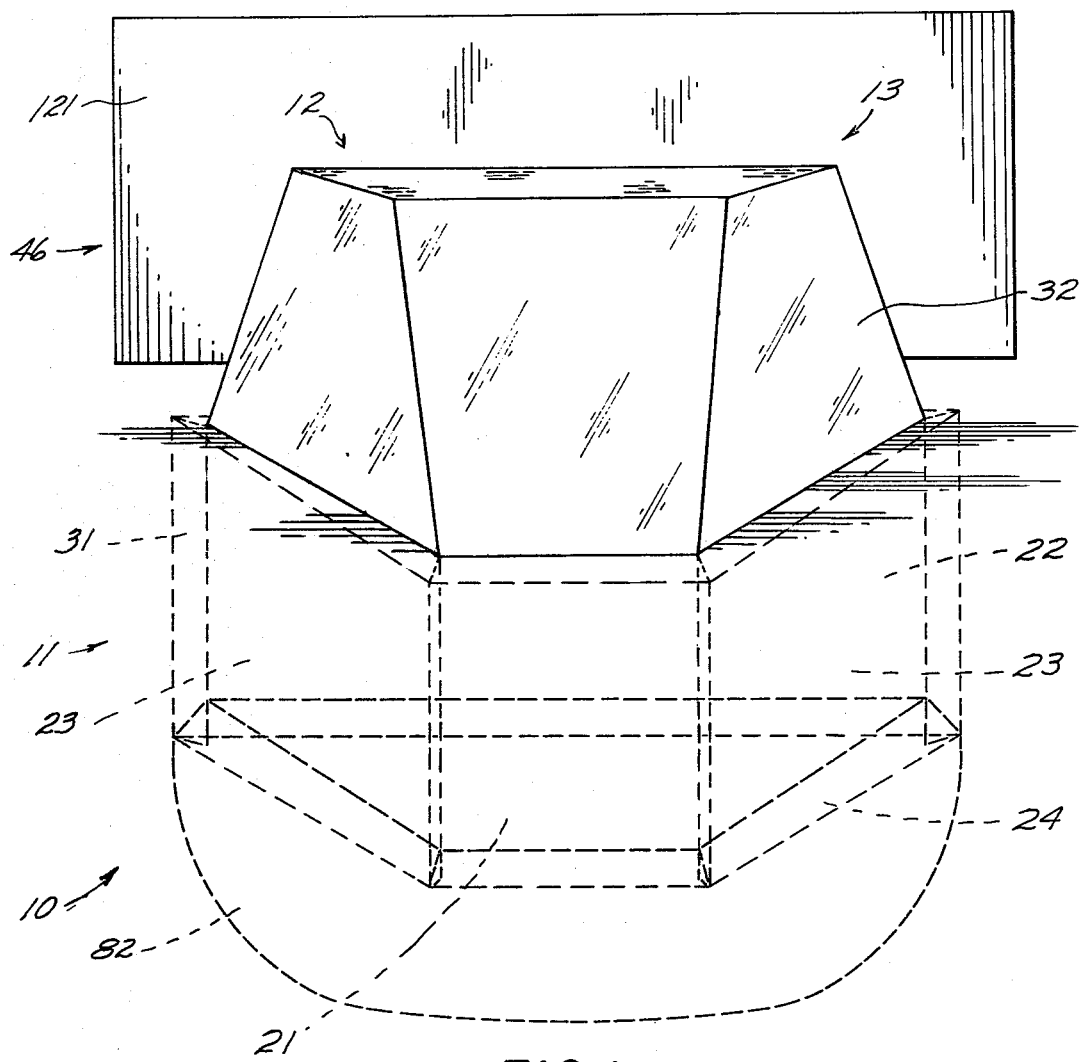
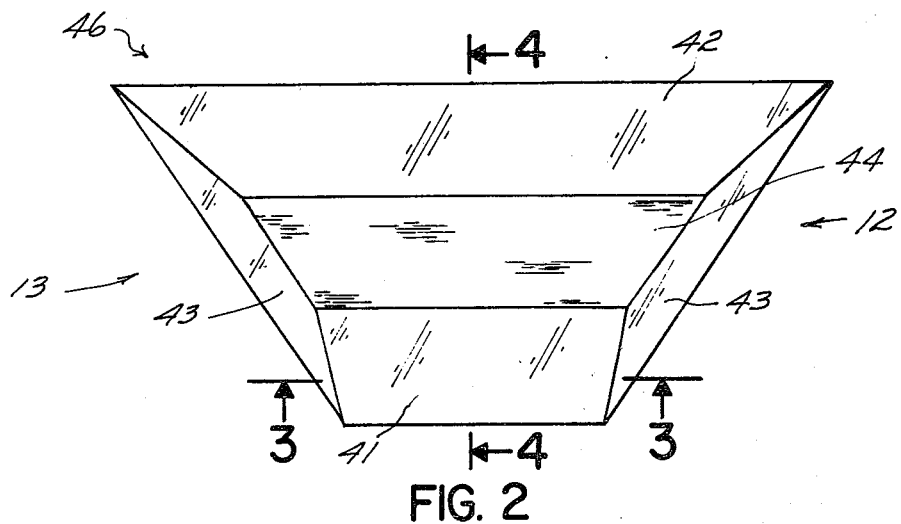
FIG. 1
FIG. 2

SOLAR HEATING SYSTEM

BACKGROUND OF THE INVENTION

Methods of solar energy conversion have taken on a new importance today in view of the world energy dilemma. This increasing energy concern has prompted the efforts of many individuals and industries to harness the energy of the sun.

One such effort is illustrated in Stelzer, U.S. Pat. No. 2,484,127, wherein a flat plate system is disclosed whereby air is passed through a solar collector such that it may absorb heat and is then passed through a cylinder of heat retaining material, so that cool air may later be pushed through the same cylinder to absorb the stored heat, and that recaptured heat may then be used to heat a house.

Other systems may be found in Lof, U.S. Pat. No. 2,680,565 and Hekes, U.S. Pat. No. 3,946,721. The main problem inherent in almost any such system is largely one of efficiency.

In addition, due to the high costs of a solar collector heating system, there is a need for a system that will also preheat water for domestic and business use. Such a dual function would reduce costs immensely.

There is also a need for a solar collector heating system that is highly efficient, so that the size of the unit is reduced over what is available in the prior art.

Therefore, the present invention is directed to fulfilling those needs of dual function, low cost, small size and efficient operation, in a solar heating system.

BRIEF SUMMARY OF THE INVENTION

The instant invention seeks to avoid the inefficiencies of prior art devices while at the same time producing an apparatus inexpensive of manufacture, durable of construction, and highly effective in use.

Therefore, it is a primary object of this invention to provide a solar heating apparatus suitable for use with residences and other business.

It is another object of this invention to provide a solar heating apparatus where the air heated by the conversion of solar energy is placed in intimate contact with the heat retaining storage materials.

It is another object of this invention to provide a solar heating apparatus that utilizes solar collectors in a multiple facing arrangement to make full use of the sun as it crosses the sky, thereby increasing efficiency and reducing size.

It is still another object of this invention to provide a solar heating apparatus that makes use of the natural insulating effects of the ground.

It is another object of this invention to provide a solar heating apparatus that is relatively unobtrusive with respect to above ground appearance in relation to the heat storing capacity contained therein.

It is a further object of this invention to provide a solar heating apparatus designed to work well with relatively inexpensive heat retaining materials.

It is a still further object of the invention to provide a system that will both heat both air and water for use within a building.

These and other objects are realized by an apparatus for use in solar energy conversion that operates to heat air for use in buildings. The apparatus includes a solar collection and radiation means, an inexpensive heat retention medium, a reflector means and a plurality of basic duct work passages.

BRIEF DESCRIPTION OF THE DRAWINGS

The objects heretofore set forth and others will become more readily apparent when taken upon reference to the following description, and especially when taken in conjunction with the appended drawings, described briefly as follows:

FIG. 1 is a front perspective view of the apparatus;

FIG. 2 is a top plan view of the apparatus;

DESCRIPTION OF THE PREFERRED EMBODIMENTS

Figure 3:
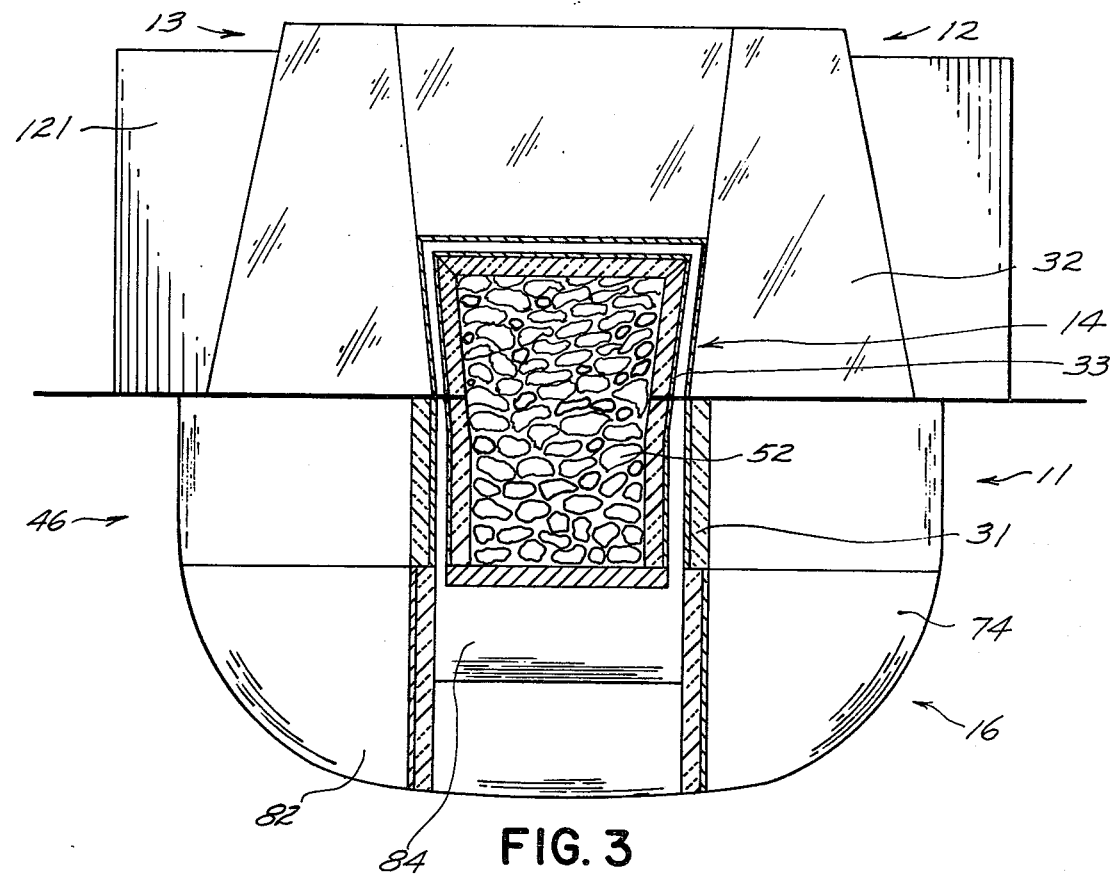
FIG. 3 is a side elevational sectional view of the apparatus taken along line 3—3 of FIG. 2.
Figure 7:
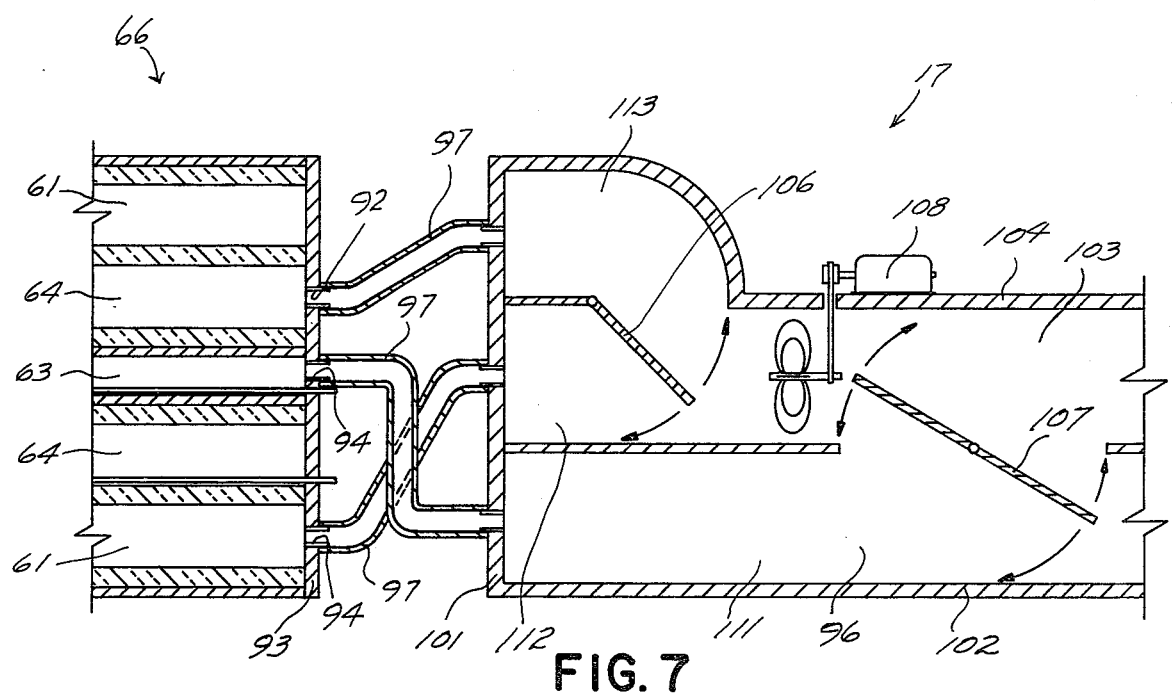
FIG. 7 is a sectioned front elevational view of the damper unit and its connection to the main triple duct trunk.

Referring now to the drawings, the solar heating apparatus may be seen generally depicted by the numeral 10 (FIG. 1). In particular, the apparatus 10 is comprised of a base unit 11 (FIG. 3), solar collector units 12, a shell 13, a heat retention medium 14, a duct work system 16, and a damper unit 17 (FIG. 7).

In FIG. 1 there is disclosed a subterranean base unit 11 and an exposed shell 13. The subterranean base unit 11 includes a front wall 21, a back wall 22, two side walls 23, and a bottom floor 24. The front wall 21 and the back wall 22 are substantially parallel to each other, with the front wall 21 being of a length shorter than the back wall 22. The two side walls 23 connect with the front wall 21 and the back wall 22 in such a way that each side wall 23 forms an obtuse angle with the front wall 21 and an acute angle with the back wall 22.

Figure 4:
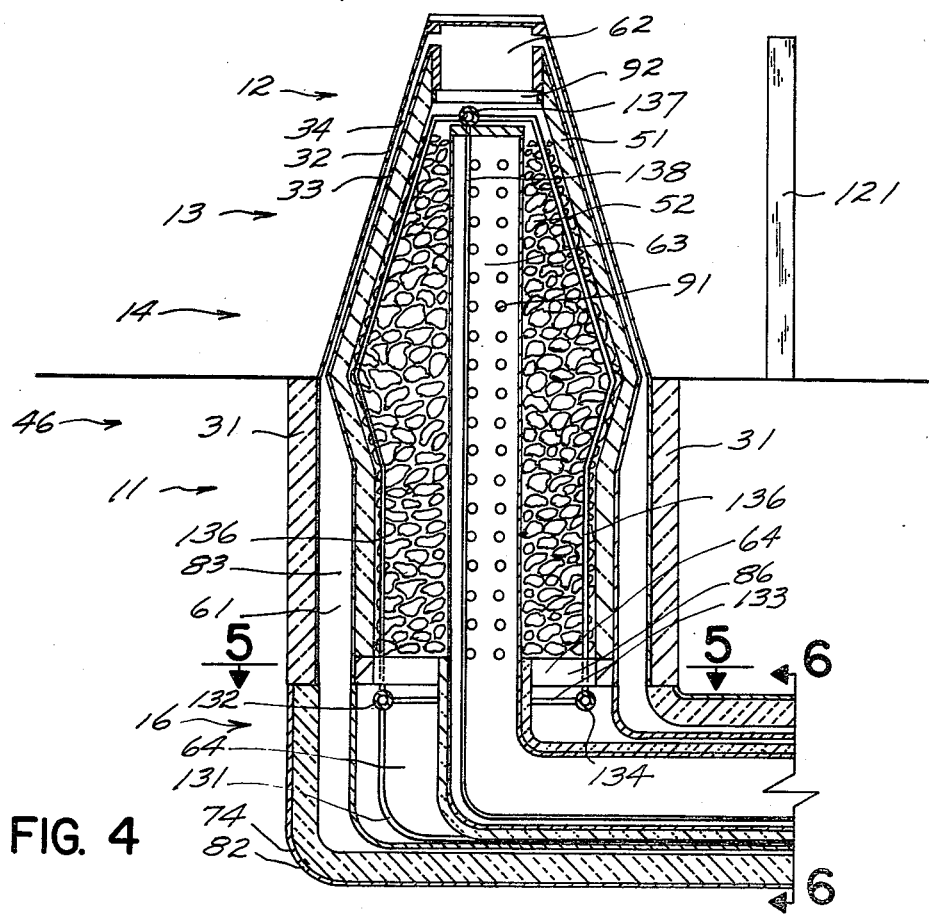
FIG. 4 is a front elevational part sectional view of the apparatus taken along line 4—4 of FIG. 2.

The bottom 24 and all four sides of the base unit 11 are surrounded by a thick insulating material 31 attached thereto. (FIG. 4).

The solar collector units 12 (FIG. 3) utilize a transparent material such as glass 32, and a heat absorbing material 33 such as blackened metal. The transparent material 32 and the heat absorbing material 33 are affixedly disposed in planes substantially parallel to one another, but with some space between them to provide a fluid passageway 34 therebetween.

For ease of manufacture, shipment and construction, the solar collector units 12 may be made of segmented units, wherein each unit is constructed in a fashion substantially similar to that described above for the entire solar collector unit. The segmented units may then be arranged and affixed so as to define one single solar collector unit.

As viewed in FIG. 2, there are four main solar collector units, one of which comprises the front wall 41 of the shell 13, one of which comprises the back wall 42 of the shell 13, and two of which comprise the two side walls 43 of the shell 13. The front wall 41 of the shell 13 is affixed to the front wall 21 of the base unit 11, the back wall 42 of the shell 13 is affixed to the back wall 22 of the base unit 11, and the two side walls 43 of the shell 13 are affixed to the two side walls 23 of the base unit 11. With respect to the shell 13, all four walls hereinbefore disclosed are affixedly disposed at an inward slope. That is, the front 41 and back walls 42 lean in towards each other, as do the two side walls 43. A horizontally disposed roof 44 is attached to all four walls of the shell 13, thereby creating an air tight vessel 46 defined by the combination of the base unit 11 and the shell 13.

The interior of the vessel 46 is lined with a thick thermal insulating material 51, (FIG. 4) to aid in the prevention of heat loss.

The interior of the vessel 46 is also seen to be filled nearly to capacity with an appropriate heat retaining material 14, such as the rocks 52 shown in this embodiment. One particularly important aspect of this choice of medium 14 should be noted. The irregular fit of the rocks 52 with respect to each other provides a myriad of pneumatic passageways, which helps to increase the efficiency of the heat transfer process.

Four duct work passages 16 direct the flow of air through the apparatus 10: the collector duct 61, the disbursement duct 62, the hot air duct 63 and the bypass duct 64.

Figure 6:
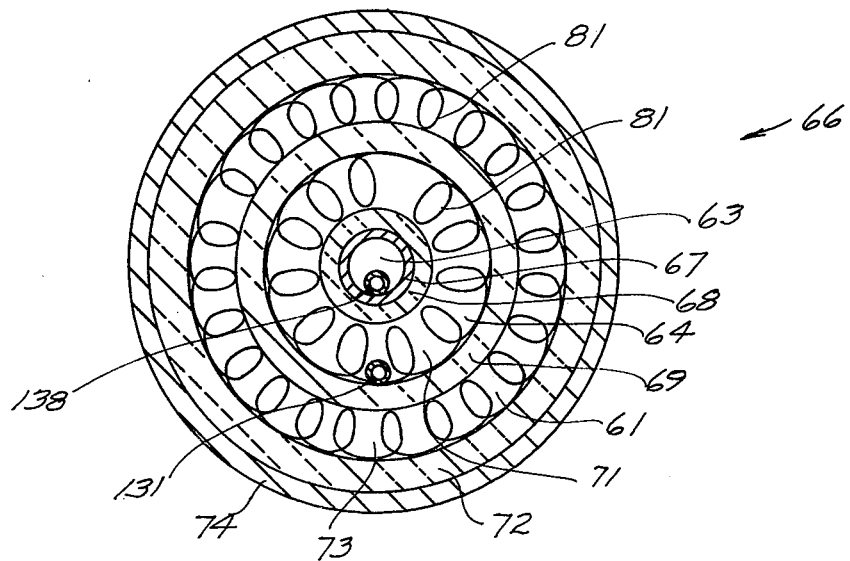
FIG. 6 is a sectioned side elevation view of the main triple duct trunk.

Three of these, the collector duct 61, the hot air duct 63 and the bypass duct 63, are in part concentrically disbursed one to the other such that a main triple-duct trunk 66 (FIG. 6) is defined thereby. As observed in FIG. 6, the trunk 66 more specifically consists of a centrally located hot air duct 63 circumscribed by a metal or plastic sleeve 67 and a layer of insulation 68. A second layer of insulation 69 surrounds the first layer 68 in such a way as to form a pneumatic passage 71 therebetween, thereby forming the bypass duct 64. A third layer of insulation 72 forms another pneumatic passageway 73 between it and the second layer of insulation 69 and defines the collector duct 61. This third layer of insulation 72 is enveloped by a plastic or metal skin 74.

The bypass duct 64 and the collector duct 61 each have spring shaped spacers 81 disposed therein such that the insulation does not collapse and block the pneumatic passageways.

Underneath the base unit 11, the trunk skin 74 is shaped like a large bowl 82. With reference to FIG. 4, the trunk skin 74 attaches to the bottom edge of the base unit 11. The collector ducts 61 then form a contigious pneumatic passageway 83 with the passageways 34 provided in the solar collector units 12.

Figure 5:
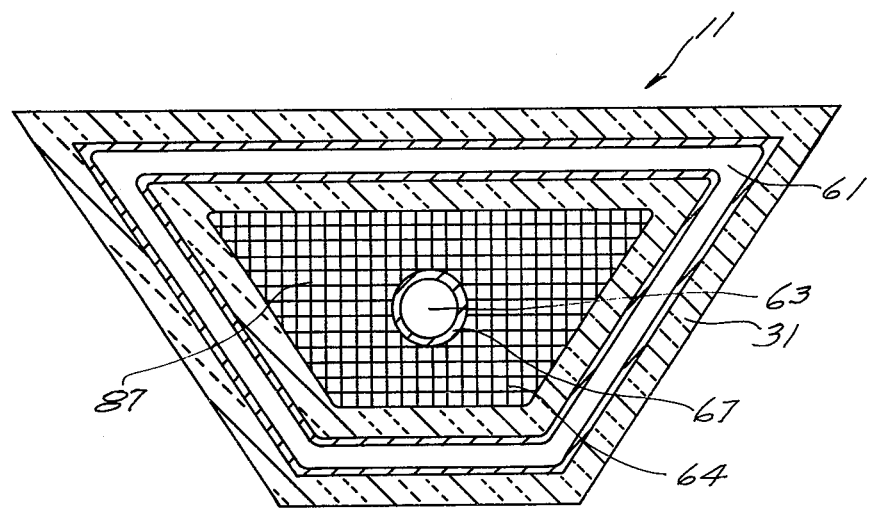
FIG. 5 is a top plan sectional view of the apparatus depicting in particular the ductwork.

Within this main bowl 82 defined by the trunk skin 74, there is a second smaller bowl 84 which attaches to the bottom of the base unit 11, and by pneumatic openings 86 therethrough, this second bowl 84 provides a pneumatic passageway into the base unit 11 for the bypass duct 64. A mesh screen 87 (FIG. 5) is disposed across the base unit 11 to prevent the rock 52 from falling therein.

Finally, the hot air duct 63 enters the base unit 11 at a substantially central point and extends vertically up into the vessel 46 defined by the base unit 11 and the shell 13. This vertical extension has its entire length perforated with many pneumatic passageways 91.

There is also a disbursement duct 62 that extends longitudinally under the roof 44 of the shell 13 and is connected in fluid communication with the pneumatic passageways 34 in the solar collector unit 12. The disbursement duct 62 has a perforated bottom plate 92, which is realized in this embodiment by the use of a wire mesh screen.

With reference to FIG. 7, the main triple-duct trunk 66 leading away from the vessel 46 terminates at a wall 93, and through holes 94 in this wall, the ducts are pneumatically attached to a damper unit 96 by the use of three hoses 97; one for each duct in the trunk.

The damper unit 17 consists of a front face plate 101 which the above mentioned hoses 97 may be pneumatically attached to, a bottom plate 102, two side plates 103 (one only is shown), a top piece 104, two dampers 106 and 107 and an electric fan unit 108. As may be seen by the drawing, the lower pneumatic passage 111 is the hot air duct 63, the middle passage 112 is the collector duct 61 and the top pneumatic passageway 113 is the bypass duct 64. An electric fan 116 is set in the middle passageway 112 between the first and second dampers 106 and 107.

The basic operation of the apparatus 10 as a source of heat may now be described as follows.

The first damper 106 is set in a horizontal plane such that the bypass duct 64 is blocked. The second damper 107 is disposed vertically to create a closed system. Air is fanned into the collector duct 61. The collector duct 61 directs the air into the solar collector units 12, wherein the air is heated by the sun. This heated air rises out of the solar collector units 12 and into the disbursement duct 62. This air is then directed out through the mesh screen bottom 92 of the disbursement duct 62 and down through the rocks 52. As the heated air passes by the rocks 52, the rocks 52 absorb the heat carried by the air, and thereby store the heat. As the air filters through the vessel 46, it is removed via the perforations 91 in the hot air duct 63. This process may be repeated continuously until the rocks 52 are sufficiently heated.

To regain the heat held within the rocks 52, and thereby use it for building heating, the bypass duct 64 is used as follows. The first damper 106 is disposed vertically, and the second damper 107 is set horizontally. Air is drawn from a standard furnace (not shown) through the middle duct 112 and routed via the top duct 113 into the bypass duct 64, where it is directed up through the bottom of the base unit 11. This air absorbs the heat from the rocks 52 and escapes through the perforations 91 in the hot air duct 63. This hot air is returned to the furnace through the hot air duct 63, and the process is repeated.

These dampers 106 and 107 may be controlled either by manual methods or by any number of servo-motors well known by anyone skilled in this art.

Heating efficiency is also increased by the use of a solar reflector 121 (FIG. 2) located proximate to the back wall 42 of the shell 13. The shell 13 is generally located such that the back wall 42 faces north, if used in the Northern Hemisphere. Consequently, little sunlight is shed upon the back wall 42. The solar reflector 121 may be set and located to reflect sunlight onto the back wall 42 and thereby gain maximum energy conversion.

As disclosed earlier, the present embodiment will also pre-heat water for use in a standard water heater. Referring to FIG. 4, tap water is brought from the building served through a pipe 131 located in the bypass duct 64. In the bypass duct bowl 84, this pipe 131 is operably connected to a manifold pipe 132 disposed across the length of the base unit 11, as well as to a second pipe 133 which is connected to a second manifold pipe 134 on the opposite side of the base unit 11. Each manifold pipe 132 and 134 has rising horizontally from it a number of capillary tubes 136, which tubes run upwards through the rocks 52. At the top of the vessel 46, the capillary tubes 136 convene at a third manifold pipe 137, through which all the heated water is routed into a single return pipe 138. The return pipe 138 is disposed within the hot air duct 63, and within which it returns to the hot water heater (not shown) pre-heated water.

It should be obvious that many variations of this embodiment will occur to those skilled in the art, and yet not depart from the spirit and scope of this invention. Such variations are intended to be within the scope of the appended claims.

I claim:

1. A solar heating system comprising:
   (a) a radiant heat collector means for heat absorption and radiation wherein said collector means includes a plurality of upwardly and outwardly exposed light admitting surfaces with said surfaces being collectively omni-directionally exposed above ground level and having a plurality of heat absorption surfaces disposed proximate the light admitting surfaces substantially parallel to said light admitting surfaces whereby a fluid passageway is defined between said surfaces;
   (b) a reflector means for directing radiant energy upon at least one of the light admitting surfaces of said collector means, said reflector means further comprising a solar heat reflecting material affixed to a substantially vertical panel;
   (c) heat storage means for retaining heat energy having a thermally isolated base unit disposed beneath the collector means, said base unit defining a vessel and said vessel containing a heat retaining medium and having a plurality of pneumatic pathways through said medium; and
   (d) ducting means for providing fluid communication between the collector means and the heat storage means, said ducting means adapted to be connected to a building, said ducting means having a first duct defining a passageway between a building, said fluid passageway between the two surfaces included in said collector means and a second duct defining a passageway between said fluid passageway between the two surfaces of said collector means and the input pneumatic pathways through the heat retaining medium and a third duct defining a passageway between the output pneumatic pathway through the heat retaining medium in a building and a fourth duct defining a passageway between the input pneumatic passageways through the heat retaining medium and a building.

2. The solar heating system of claim 1 wherein said third duct and said fourth duct are co-linearly disposed in a concentrically contained duct in which said fourth duct is disposed within said third duct.

3. The solar heating system of claim 2 wherein said first duct and said fourth duct having valve means for regulating the passage of air therethrough.

4. The solar heating system of claim 3 wherein said collector means is comprised of a front plate, a back plate, a first side plate, a second side plate and a top plate; said plates joined at the edges so as to form a truncated pyramidical structure.

5. The solar heating system of claim 4 wherein the back plate of said collector means is disposed vertically to the ground, the front plate of said collector means is disposed at an obtuse angle to the top plate, the first and second side plates are disposed at obtuse angles to the top plate and the reflector means is disposed to the back plate whereby solar heat energy is reflected upon said back plate.

6. The solar heating system of claim 5 further comprising:
   (a) a plurality of pipe manifolds in fluid communication with a source of water;
   (b) a plurality of capillary tubes in fluid communication with the pipe manifolds, said tubes disposed within the collector means; and
   (c) a return pipe manifold in fluid communication with the capillary tubes and adapted to connecting to a water heater.

* * * * *